(12) United States Patent
Adda et al.

(10) Patent No.: US 7,412,512 B2
(45) Date of Patent: Aug. 12, 2008

(54) INDIRECT ADDRESSING METHOD AND SYSTEM FOR LOCATING A TARGET ELEMENT IN A COMMUNICATION NETWORK

(75) Inventors: Serge Henri Moïse Adda, Antony (FR); Loïc Pierre Alfred Mathieu, Limours (FR)

(73) Assignee: Infovista SA, Les Ulis (FR)

( * ) Notice: Subject to any disclaimer, the term of this patent is extended or adjusted under 35 U.S.C. 154(b) by 457 days.

(21) Appl. No.: 10/497,904

(22) PCT Filed: Dec. 6, 2002

(86) PCT No.: PCT/FR02/04202

§ 371 (c)(1),
(2), (4) Date: Oct. 15, 2004

(87) PCT Pub. No.: WO03/049407

PCT Pub. Date: Jun. 12, 2003

(65) Prior Publication Data

US 2005/0071456 A1 Mar. 31, 2005

(30) Foreign Application Priority Data

Dec. 7, 2001 (FR) .................. 01 15818

(51) Int. Cl.
*G06F 15/173* (2006.01)

(52) U.S. Cl. .......... 709/225; 709/219; 709/226; 709/228; 707/6

(58) Field of Classification Search ............ 709/225, 709/227, 219, 228, 226; 707/6
See application file for complete search history.

(56) References Cited

U.S. PATENT DOCUMENTS

| | | |
|---|---|---|
| 5,291,583 A | 3/1994 | Bapat |
| 5,588,119 A | 12/1996 | Vincent et al. |
| 6,292,909 B1 | 9/2001 | Hare |

FOREIGN PATENT DOCUMENTS

WO    WO 99/57837    11/1999

OTHER PUBLICATIONS

MIB, SMIC (the next generation) version 1.6.29, 1994,92.*
"How to add a Protocol Definition to a Cisco Switchprobe Using SNIMP", Cisco tech Notes, 'Online! Jun. 18, 2001, pp. 1-3 XP002210621, retrieved from the Internet: <URL:http://web.archive.org/web/20010618125039/http://cisco.com/warp/public/477/SP/add_protocol_def.html> 'retrieved on Aug. 21, 2002!.

* cited by examiner

*Primary Examiner*—Saleh Najjar
*Assistant Examiner*—Marie Georges Henry
(74) *Attorney, Agent, or Firm*—Young & Thompson

(57) ABSTRACT

A method of guaranteeing that a communication network server can reach an element that is remote from the network using a path or link which is automatically updated when the remote element is moved within the network. The method employs indirect addressing (lookup table), and is used, in particular, in network performance measuring systems.

9 Claims, 6 Drawing Sheets

TD1

Figure 1:
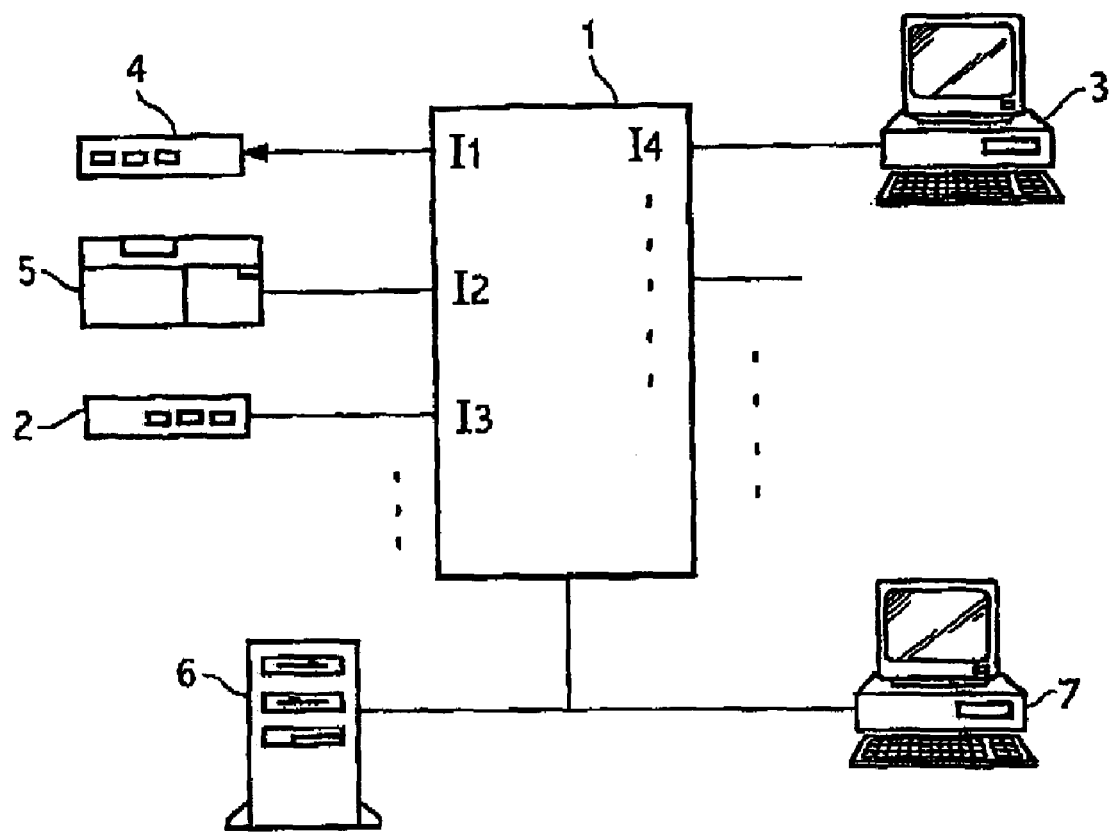

| protocolDirDescr | protocolDirId | protocolDirParameters |
|---|---|---|
| SERIAL0 | 17 | 70 |
| SERIAL1 | 18 | 71 |
| ETHERNET | 64 | 72 |
| SERIAL2 | 65 | 73 |

TL1

| protocolDirLocalIndex | protocolDirId | protocolDirParameters |
|---|---|---|
| 1 | 17 | 70 |
| 2 | 18 | 71 |
| 3 | 64 | 72 |
| 4 | 65 | 73 |

FIG 2

TD2

| protocolDirDescr | protocolDirId | protocolDirParameters |
|---|---|---|
| SERIAL0 | 17 | 70 |
| SERIAL1 | 18 | 71 |
| ETHERNET | 64 | 72 |
| SERIAL2 | 65 | 73 |

TL2

| protocolDirLocalIndex | protocolDirId | protocolDirParameters |
|---|---|---|
| 1 | 17 | 70 |
| 2 | 18 | 71 |
| 7 | 64 | 72 |
| 4 | 65 | 73 |
| 3 | 66 | 74 |

FIG 3

TD3

| protocolDirDescr | protocolDirId | protocolDirParameters |
|---|---|---|
| SERIAL0 | 17 | 70 |
| SERIAL1 | 18 | 71 |
| ETHERNET | 64 | 72 |
| SERIAL2 | 65 | 73 |

TL3

| protocolDirLocalIndex | protocolDirId | protocolDirParameters |
|---|---|---|
| 1 | 17 | 70 |
| 2 | 18 | 71 |
| 7 | 64 | 72 |
| 4 | 65 | 73 |
| 3 | 66 | 74 |

FIG 4

TD4

| protocolDirDescr | protocolDirId | protocolDirParameters |
|---|---|---|
| ETHERNET | 17 | 70 |
| SERIAL1 | 18 | 71 |
| SERIAL0 | 64 | 72 |
| SERIAL2 | 65 | 73 |

TL4

| protocolDirLocalIndex | protocolDirId | protocolDirParameters |
|---|---|---|
| 1 | 17 | 70 |
| 2 | 18 | 71 |
| 7 | 64 | 72 |
| 4 | 65 | 73 |
| 3 | 66 | 74 |

FIG 5

TD5

| protocolDirDescr | protocolDirId | protocolDirParameters |
|---|---|---|
| ETHERNET | 17 | 70 |
| SERIAL1 | 18 | 71 |
| SERIAL0 | 64 | 72 |
| SERIAL2 | 65 | 73 |

TL5

| protocolDirLocalIndex | protocolDirId | protocolDirParameters |
|---|---|---|
| 1 | 17 | 70 |
| 2 | 18 | 71 |
| 7 | 64 | 72 |
| 4 | 65 | 73 |
| 3 | 66 | 74 |

FIG 6

INDIRECT ADDRESSING METHOD AND SYSTEM FOR LOCATING A TARGET ELEMENT IN A COMMUNICATION NETWORK

The present invention relates to an indirect addressing method to guarantee the adequacy between a target element in a communication network and a link allowing the location of that target element by a server connected to the network. It also relates to a system implementing this method. It has a particularly advantageous, though not exclusive, application in the field of modelling an information system, or communication network, for the purpose of measuring performance and service quality monitoring within the information system.

The growing complexity of information systems which integrate, in particular, client-server architectures and integrated local networks, is making it increasingly difficult to measure performance and to effectively monitor service quality within these systems. Many systems offering solutions for managing such networks wish to improve the control ergonomics of the systems by replacing the crude values, generally digital, intended to distinguish the entities connected to the networks, with a more explicit alphanumeric form. This is for example the case when the addresses or interface numbers of each entity in a network are replaced by a name directly indicating the entity in question such as, for example, "Ethernet", "Serial", etc. In practice, the name "Ethernet" is attached to a link that indicates the path to the entity in question.

Now, such a method can be a source of problems when the entity is physically moved within the network without updating the link. Thus, when the user enters the name "Ethernet" in order to consult the associated entity, he risks consulting an undesired entity or having an error message.

The invention aims to overcome this drawback by proposing an indirect addressing method or "Lookup Table".

The objective of the present invention is to propose an indirect addressing method making it possible to improve the ergonomics and the maintenance of a system for measuring the performance of a communication network.

Another objective of the invention is to obtain a considerable time saving when it is a matter of finding, for example, the new location of an entity that has just been moved.

These objectives are achieved with a method for locating a target element in a communication network by means of a link composed of a first index and a descriptive name. The index can correspond to an address in the form of a number. The descriptive name can be in alphanumeric form in order to distinguish the target element easily. This name is defined in the server as a value that can be assigned to a description variable, this description variable being defined by a set of description parameters. According to the invention, the method comprises a link updating process in which:

- on the basis of the description name, the value of at least one description parameter is determined by means of a description table,
- on the basis of the description parameter value thus determined, a second index is determined by means of an indexing table, and
- the link henceforth composed of this second index and of the description name is updated.

The method according to the invention furthermore comprises a consultation process in which:

- on the basis of a reference value of the description parameter, a new description name is determined by means of the description table,
- on the basis of a reference index, a new value of the description parameter is determined by means of the indexing table, and
- it is checked if the new description name and the new value of the description parameter thus determined respectively correspond to a reference description name and to the reference value of the description parameter; in the affirmative, the target element is accessed via a reference link; in the negative, the updating process is executed.

The reference can advantageously correspond to a preceding consultation process.

The index corresponds to an item of information on the physical location of the target element. A modification of this location corresponds to a modification in one of the tables. The invention is thus noteworthy by the fact that it carries out an automatic updating of new locations.

According to the invention, the index can be defined in the server as a value that can be assigned to an indexing variable, this indexing variable being defined by a set of indexing parameters, this set being at least a subset of the description parameters.

In other words, the method according to the invention uses two tables, a first description table in which it is possible to determine the value of the description parameters when a given description name is assigned to the description variable; a second indexing table in which it is possible to determine a given index for given values of the description parameters. These tables reflect the architecture of the network: if an element of the network is moved or modified, at least one of the two tables is modified.

The consultation process corresponds to a normal functioning in which the server wishes to retrieve information relating to the target element. The server checks that the link conforms with the architecture of the network, that is to say that the description name correctly refers to the correct index. In order to do this, the preceding consultation process is taken as reference, and it is checked that the description and indexing tables have not been modified. In the contrary case, the updating process is carried out in order to find the new index to which the description name describing the target element corresponds.

Advantageously, the index can correspond to an interface of a router to which the target element is connected.

According to another aspect of the invention, an indirect addressing system is proposed for locating a target element connected to a router of a communication network by means of a link composed of a first index and a description name. The server comprises means for retrieving information relating to the target element on the router. According to the invention, the server furthermore comprises, during an updating process:

- means for determining, on the basis of the description name and within a description table, the value of at least one description parameter,
- means for determining, on the basis of the description parameter value thus determined and within an indexing table, a second index by means of an indexing table, and
- means for updating the link henceforth composed of this second index and of the description name.

Moreover, the server furthermore comprises, during a consultation process:

- means for determining, on the basis of a reference value of the description parameter, a new description name by means of the description table,
- means for determining, on the basis of a reference index, a new value of the description parameter by means of the indexing table, and means for checking if the new description name and the new value of the description parameter thus determined respectively correspond to a reference description name and to the reference value of the description parameter; in the affirmative, means for accessing the target element via a reference link; in the negative, means for executing the updating process.

Other features and advantages of the invention will furthermore appear in the following description. In the appended drawings, given as non-limiting examples:

FIG. 1 is an overall block diagram illustrating a hardware architecture forming a communication network on which the method according to the invention is implemented in the context of a system for measuring the performance of the said network;

FIGS. 2, 3 and 5 each comprise a description table and an indexing table, both of which illustrate a consultation process;

FIGS. 4 and 6 each comprise a description table and an indexing table, both of which illustrate an updating process.

A hardware architecture forming a network in which the method according to the invention is implemented will now be described with reference to FIG. 1. This network is composed of elements or entities (network equipment, systems, etc) 1 to 7. The maintenance of the network is carried out by the user 7 by means of performance measuring software installed in the server 6. A user can also act directly on the server 6 when provided with the necessary display and data entry means (screen and keyboard). The router 1 comprises a plurality of interfaces I1, I2, . . . , to which are connected the entities 2, 3, 4 and 5, referred to in an overall manner by the expression "remote resources". Each resource can be referenced by an index corresponding to an interface number to which it is connected: the index "1" corresponding to the interface number I1, for example. Furthermore, each resource has an explicit description name, or example such as "ETHERNET" for the resource 2, or "SERIAL 1" for the resource 3. An index attached to a description name constitutes a link that the server 6 records during the installation of the network.

The functioning of the maintenance software is such that when the user wishes to obtain information on the resource 2, he entered the description name "ETHERNET" and the server 6 establishes a formula such as, for example in the case of simple indirect addressing:

IfInOctets[ifDescr="Ethernet"] IfInOctets[ifIndex=3]

This amounts to counting the number of bytes entering through the interface I3 (index equal to 3), in other words, the link "3 ETHERNET" is activated. However, when the resource 2 is moved, it is necessary to update the new location of that resource.

The principal processes allowing this automatic updating will now be described with reference to FIGS. 2 to 6 successively and using the maintenance software in a multiple addressing configuration. Furthermore, this software processes data coming from any equipment supporting the SNMP (Simple Network Management Protocol) protocol and includes a dedicated support for the Remote Monitoring (RMON) MIB standard. This standard support allows access to groups of variables such as nlMatrixDSTable or protocolDirTable.

It is considered, a priori, that the resource "ETHERNET" is connected to the interface I3 and that the server wishes to execute the following formula coming from the user 7:

nlMatrixDSPkts[protocolDirDescr=*.ip.tcp.ftp]   (1)

where nlMatrixDSPkts is a variable of the nlMatrixDSTable group and protocolDirDescr is a description variable of the protocolDirTable group. This description variable is defined by two description parameters, protocolDirId and protocolDirParameters according to the tables TD and TL in FIGS. 2 to 6. Thus for each description name assigned to the description variable protocolDirDescr, it is possible to determine the values of the parameters protocolDirId and protocolDirParameters.

In order to execute the formula (1), the server carries out an initial consultation process illustrated in FIG. 2, that is to say a verification in order to ensure that the link "3 ETHERNET" is effective. With the formula (1) and according to the RMON MIB standard, the server expects to find, in the place of the description variable protocolDirDescr, a parameter called protocolDirLocalIndex which is in fact the previously defined index. This parameter is not included in the nlMatrixDSTable group.

The server carries out a preliminary initialisation step in which it checks that protocolDirLocalIndex is also found as an indexing variable in the protocolDirTable group of the description variable protocolDirDescr. The indexing variable protocolDirLocalIndex is also defined by the parameters protocolDirId and protocolDirParameters. The process then continues taking the tables TD1 and TL1 referenced in FIG. 2.

In FIG. 2 the description variable protocolDirDescr can be assigned with the description names of protocols such as *.ip.tcp.ftp-data, *.ip.tcp.ftp, ip.tcp.telnet, *.ip.tcp.smtp, *.ip.tcp.dns, *.ip.tcp.gopher, *.ip.tcp.www-http, *.ip.tcp.pop3, *.ip.tcp.nntp. The reference data, in particular obtained after a preceding consultation, are such that ETHERNET corresponds to the values of the parameters (protocolDirId=64, protocolDirParameters=72). The consultation process in progress consists, starting from the pair (64, 72) and using the table TD1, in verifying if the corresponding description name is still ETHERNET. In the table TD1, it is correctly found that (64, 72) gives ETHERNET. Then, in the table TL1, it is seen that it is possible to assign location indices corresponding to the interfaces I1, I2, . . . to the indexing variable protocolDirLocalIndex. Starting from the index "3", it is checked that the values of the parameters are correctly (64, 72). This first consultation process using the tables TD1 and TL1 confirms that the link "3⇔ETHERNET" is effective. The formula (1) is then modified by:

nlMatrixDSPkts[protocolDirLocalIndex=3].

In FIG. 3, the server wishes to execute Formula (1) again but, meanwhile, the hardware architecture of the network has been modified by connecting the resource 2 to the interface I7 of FIG. 1 and this has resulted in a modification of the table TL according to FIG. 3. In order to do this a second consultation process is started. A preliminary initialisation step is carried out and then the table TD2 is taken and it is verified that the pair of parameters (64, 72) corresponds to the description name "ETHERNET". Then the table TL2 is taken and it is seen that the index "3" does not give the pair (62, 72) but gives the pair (66,74). In this case, a process to update the link corresponding to the description name "ETHERNET" is initiated.

This updating process is illustrated in FIG. 4. The table TD3 is taken and, starting from the description name "ETHERNET", the corresponding pair of parameters is determined. The pair (64, 72) is found. Table TL3 is then taken and, starting from the pair (64, 72) thus determined in TD3, the corresponding index is determined and "7" is found. The server can thus execute the formula (1) by replacing it with:

nlMatrixDSPkts[protocolDirLocalIndex=7]

In FIG. 5, the server wishes to execute formula (1) again but, meanwhile, the hardware architecture of the network has been modified. The resource 2 is henceforth accessible via the interface I1 such that only the table TD4 has been modified. A third consultation process is started. A preliminary initialisation stage is carried out and then table TD4 is taken and, starting from the pair of parameters (64, 72) a check is carried out to see if the corresponding description name is actually "ETHERNET". It is found that the pair (64, 72) corresponds to the description name "SERIAL0". In this case, an updating process is initiated, The pair of parameters corresponding to the index 7 can also be determined from the table TL4. (64, 72) is found and therefore there has been no modification in that table TL5.

FIG. 6 shows the second updating process which makes it possible to determine, by means of the table TD5, that the pair of parameters (17, 70) corresponds to the description name "ETHERNET" and that, by means of table TL5, this pair of parameters (17, 70) corresponds to the index 1, that it to say to the interface I1. The server can thus execute the formula (1) by replacing it with:

nlMatrixDSPkts[protocolDirLocalIndex=1].

The invention is not of course limited to the examples that have just been described and numerous modifications can be applied to these examples without departing from the scope of the invention.

The invention claimed is:

1. Indirect addressing method, comprising the step of:
    locating a remote resource reference to a router, in a communication network, with a server of the network using a link composed of a first index and a description name to allow a performance measuring software to locate said remote resource from the description name,
    in said locating step, the server carrying out an updating process in which:
        on the basis of said description name, the value of at least one description parameter is determined by means of a description table contained in the router,
        on the basis of the description parameter value thus determined, a second index is determined by means of an indexing table, and
        the link henceforth composed of this second index and of the description name is updated in the server.

2. Method according to claim 1, further comprising a consultation process in which:
    on the basis of a reference value of the description parameter, a new description name is determined by means of the description table,
    on the basis of a reference index, a new value of the description parameter is determined by means of the indexing table, and
    checking if the new description name and the new value of the description parameter thus determined respectively correspond to a reference description name and to said reference value of the description parameter; in the affirmative, the remote resource is accessed via a reference link; in the negative, the updating process is executed.

3. Method according to claim 2, wherein said description name is defined in the server as a value that can be assigned to a description variable, said description variable being defined by at least said description parameter.

4. Method according to claim 1, wherein said description name is defined in the server as a value that can be assigned to a description variable, said description variable being defined by at least said description parameter.

5. Method according to claim 1, wherein said index is defined in the server as a value that can be assigned to an indexing variable, said indexing variable being defined by a set of indexing parameters, this set being at least a subset of the description parameters.

6. Method according to claim 1, wherein said index corresponds to an interface of a router to which said remote resource is connected.

7. Method according to claim 1, wherein the reference value of the description parameter, the reference description name, the reference index and the reference link correspond to the data used during a preceding consultation.

8. Indirect addressing system for locating a remote resource connected to a router of a communication network, wherein a server of the network uses a link composed of a first index and a description name to allow a performance measuring software to locate said remote resource from the description name, the server comprising means for retrieving information relating to said remote resource on the router, wherein the server furthermore comprises, during an updating process:
    means for determining, on the basis of the description name and within a description table, the value of at least one description parameter,
    means for determining, on the basis of the description parameter value thus determined and within an indexing table, a second index by means of the indexing table, and
    means for updating said link henceforth composed of this second index and of said description name.

9. System according to claim 8, wherein the server furthermore comprises, during a consultation process:
    means for determining, on the basis of a reference value of said description parameter, a new description name by means of the description table,
    means for determining, on the basis of a reference index, a new value of the description parameter by means of the indexing table, and
    means for checking if the new description name and the new value of the description parameter thus determined respectively correspond to a reference description name and to said reference value of the description parameter; in the affirmative, means for accessing the said remote resource via a reference link; in the negative, means for executing the updating process.

* * * * *